(12) United States Patent
Sacerio et al.

(10) Patent No.: US 9,122,920 B1
(45) Date of Patent: Sep. 1, 2015

(54) DIGITAL MANIFOLD GAUGE WITH INTEGRAL PRESSURE-TEMPERATURE ALGORITHMS AND ROTATABLE DISPLAY MEANS

(75) Inventors: Jose L. Sacerio, Hialeah, FL (US); Juan Saluzzio, Miami, FL (US); Michael Pruszynski, Hialeah, FL (US); Hung Luu, Hialeah, FL (US); Karl Russell, Hialeah, FL (US)

(73) Assignee: CPS Products, Inc., Hialeah, FL (US)

( * ) Notice: Subject to any disclaimer, the term of this patent is extended or adjusted under 35 U.S.C. 154(b) by 531 days.

(21) Appl. No.: 13/553,937

(22) Filed: Jul. 20, 2012

(51) Int. Cl.
*G06K 1/00* (2006.01)
*G06K 9/00* (2006.01)

(52) U.S. Cl.
CPC .................. *G06K 9/00369* (2013.01)

(58) Field of Classification Search
CPC ................ F24F 1/26; F24F 11/00; F24F 1/34
USPC .......................................... 702/130, 182–185
See application file for complete search history.

(56) References Cited

U.S. PATENT DOCUMENTS

| 5,875,413 | A | 2/1999 | Vinci | |
| 7,437,941 | B1 | 10/2008 | Ward | |
| 7,469,591 | B1 | 12/2008 | Chuang | |
| 7,685,882 | B1* | 3/2010 | Ward | 73/753 |
| 8,069,731 | B2 | 12/2011 | Ward | |
| 2001/0002552 | A1 | 6/2001 | Vinci | |
| 2004/0127267 | A1* | 7/2004 | Wong et al. | 455/575.1 |

FOREIGN PATENT DOCUMENTS

JP           2009168366        7/2009

* cited by examiner

*Primary Examiner* — Edward Raymond
(74) *Attorney, Agent, or Firm* — Malin Haley DiMaggio & Bowen, P.A.

(57) ABSTRACT

A digital manifold gauge having a gauge assembly with a display, one or more selectors, and a circuit board wherein the gauge assembly is rotatably disposed within a gauge housing and adapted to rotate to provide a plurality of viewing positions for the user. The circuit board is in electrical communication with a sensor port and the sensor port is adapted to receive a sensor transducer, such as a pressure transducer. The gauge includes internal software and logic for data processing and manipulation. The gauge includes a software algorithm adapted to convert pressure data transmitted to the circuit board from the pressure transducer into temperature data. The temperature and pressure data can be displayed on the display in real time and the gauge can also provide graphing and charting of the pressure-temperature relationship. The gauge is compatible with a variety of refrigerants and other fluids flowing through HVAC systems.

11 Claims, 8 Drawing Sheets

DIGITAL MANIFOLD GAUGE WITH INTEGRAL PRESSURE-TEMPERATURE ALGORITHMS AND ROTATABLE DISPLAY MEANS

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

The present invention generally relates to digital gauges and more specifically to a digital air or gas manifold gauge having integral pressure-temperature algorithms and a rotatable display means.

2. Description of Related Art

In the field of HVAC (heating, ventilation, and air conditioning) there is a marked need for devices to provide readouts at various points in HVAC systems in order to monitor and assess performance of same. Typically, an HVAC servicer is interested in identifying the pressure, temperature and other operating conditions of the various liquid and gas flows throughout the systems. This includes the temperature and pressure of the refrigerants and propellants as well as the heated, cooled, or ventilated air.

A typical refrigerant gauge comprises a Bourdon tube mechanical-type gauge that provides a plurality of analog scales on single gauge in order to show the saturation temperature for various refrigerants given the reading of the pressure by the gauge. These gauges therefore utilize a set conversion from pressure detection to temperature readout. The disadvantage of these traditional devices is that accommodating a multiplicity of refrigerants on a single gauge makes the increasing number of scales difficult to read. Consequently, a user has to choose a mechanical gage limited to the refrigerants he normally uses. As the number of refrigerant options increases this becomes a limiting factor requiring, more often than not, the purchase or multiple manifold gauges to cover a mechanic's range of daily jobs.

Many manufacturers have offered the industry the option of using digital techniques to display pressure accurately and conveniently in a manifold formatted gage. However, in the case of these digital gages, the display of the corresponding saturation temperatures for various refrigerants has been neglected, severely limiting the usefulness of the devices. Furthermore, the majority of these devices are provided in the form of a handheld device having a plurality of wires extending therefrom, which can be unwieldy and inconvenient to use, particularly in tight spaces.

The reason for providing the pressure-temperature (P-T) relationship for various refrigerants on the face of a digital gage is to allow the service technician to charge an AC system accurately using the superheat specification for the system and/or to diagnose it using the sub-cooling settings provided by the manufacturer. This function requires, in addition to the saturation temperature information, the measurement of temperature at specific points in the AC system concurrent to the measurement of pressure at similarly specific points in the system. There have been many attempts at providing improved digital manifold gauges for refrigerant and other HVAC systems, however none have adequately address the usability and convenience factors that the present invention addresses.

It is, therefore, to the effective resolution of the aforementioned problems and shortcomings of the prior art that the present invention is directed. However, in view of the digital manifold gauges in existence at the time of the present invention, it was not obvious to those persons of ordinary skill in the pertinent art as to how the identified needs could be fulfilled in an advantageous manner.

SUMMARY OF THE INVENTION

The present invention provides a digital manifold gauge comprising: a gauge assembly having a display, one or more selectors, and a circuit board wherein the gauge assembly is rotatably disposed within a gauge housing and adapted to rotate to provide a plurality of viewing positions for the user. The circuit board is in electrical communication with a sensor port and the sensor port is adapted to receive a sensor transducer, such as a pressure transducer. The circuit board includes a software algorithm adapted to convert pressure data transmitted to the circuit board from the pressure transducer into temperature data. The temperature and pressure data can be displayed on the display in real time and the gauge can also provide graphing and charting of the pressure-temperature relationship. The gauge is configured to be compatible with a variety of refrigerants and other fluids flowing through HVAC systems. The gauge also includes a plurality of selectors, such as buttons, for navigating through various menus and settings shown on the display and controlled by the internal software and logic of the gauge.

The present invention further comprises a method of determining a temperature of a given refrigerant by receiving on the digital manifold gauge, from a pressure transducer, sensor data relating to the pressure of said given refrigerant; converting, by way of software on the digital manifold gauge, the sensor data to computer-readable digital pressure data; and processing the digital pressure data through an algorithm in the software on the digital manifold gauge to generate digital temperature data. The method further comprises the step of displaying on the digital manifold gauge, the digital pressure data and the digital temperature data in real time. The algorithm comprises a pressure-temperature relationship of the given refrigerant and allows a calculation and conversion of the pressure into temperature, which may include the saturated vapor temperature of same.

Accordingly, it is an object of the present invention to provide a digital manifold gauge for use in connection with refrigerator and other HVAC systems that is easy to operate and utilize in conjunction with a variety of refrigerants.

It is another object of the present invention to provide a digital manifold gauge that includes a rotatable gauge assembly that provides a plurality of viewing positions for the user, regardless of the location or installation of the gauge.

It is yet another object of the present invention to provide a digital manifold gauge that can convert a pressure reading into a temperature reading based on a known pressure-temperature relationship utilizing a software algorithm.

It is yet another object of the present invention to provide a digital manifold gauge that display both pressure and temperature in real time on a high-resolution display.

In accordance with these and other objects which will become apparent hereinafter, the instant invention will now be described with particular reference to the accompanying drawings.

DETAILED DESCRIPTION

Figure 1:
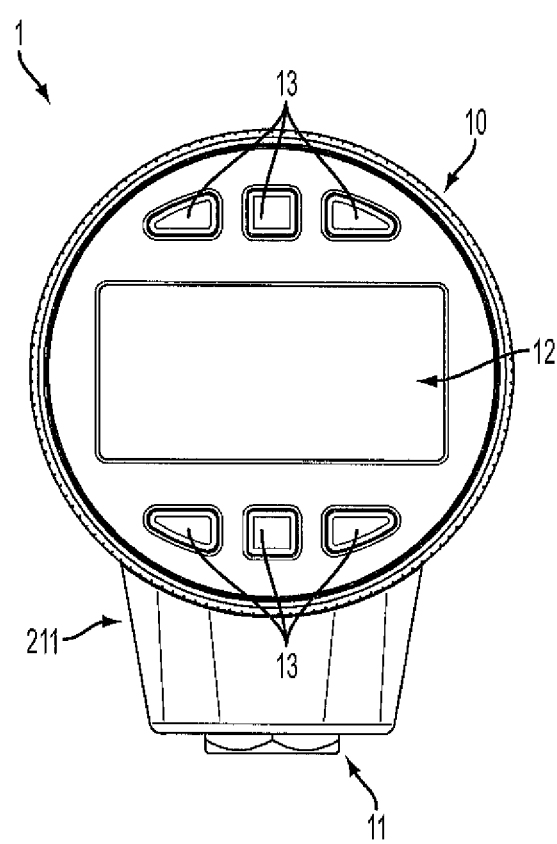
FIG. 1 is a front view of one embodiment of the digital manifold gauge of the present invention.

FIG. 1 is a front view of one aspect of the present invention. Shown is digital manifold gauge 1 comprising a gauge body 10, a stem 211, sensor port 11, a display 12, and one or more operation selectors 13. In some embodiments, the stem 211 extends below the gauge body 10 and provides a housing for the sensor port 11. The sensor port 11 is configured to provide a means for attaching an external sensor probe, such as a pressure sensor probe, to the circuitry within the gauge body 10.

The display 12 is utilized to display readout information such as pressure, temperature, and the like while also providing the user with a means to navigate various options, settings, and readout modes as desired. In some embodiments, the display 12 comprises a liquid crystal display (LCD), but other displays are equally contemplated such as light-emitting diode (LED) displays, organic light-emitting diode (OLED) display, grayscale or bit-stream display, and other like electronic displays. The display is capable of displaying in color as well as black and white and is configured in certain embodiments to be relatively high-resolution in order to provide optimum viewing for the user and to provide complex readouts of a variety of data.

The selectors 13 are provided on the front of the gauge body 10 and provide a means to selectively operate the various functions of the gauge 1. In some embodiments, the selectors 13 comprise electro-mechanical depressible buttons but, in other embodiments, they may comprise discrete touch screen actuators or other known selection means known in the art.

Figure 2:
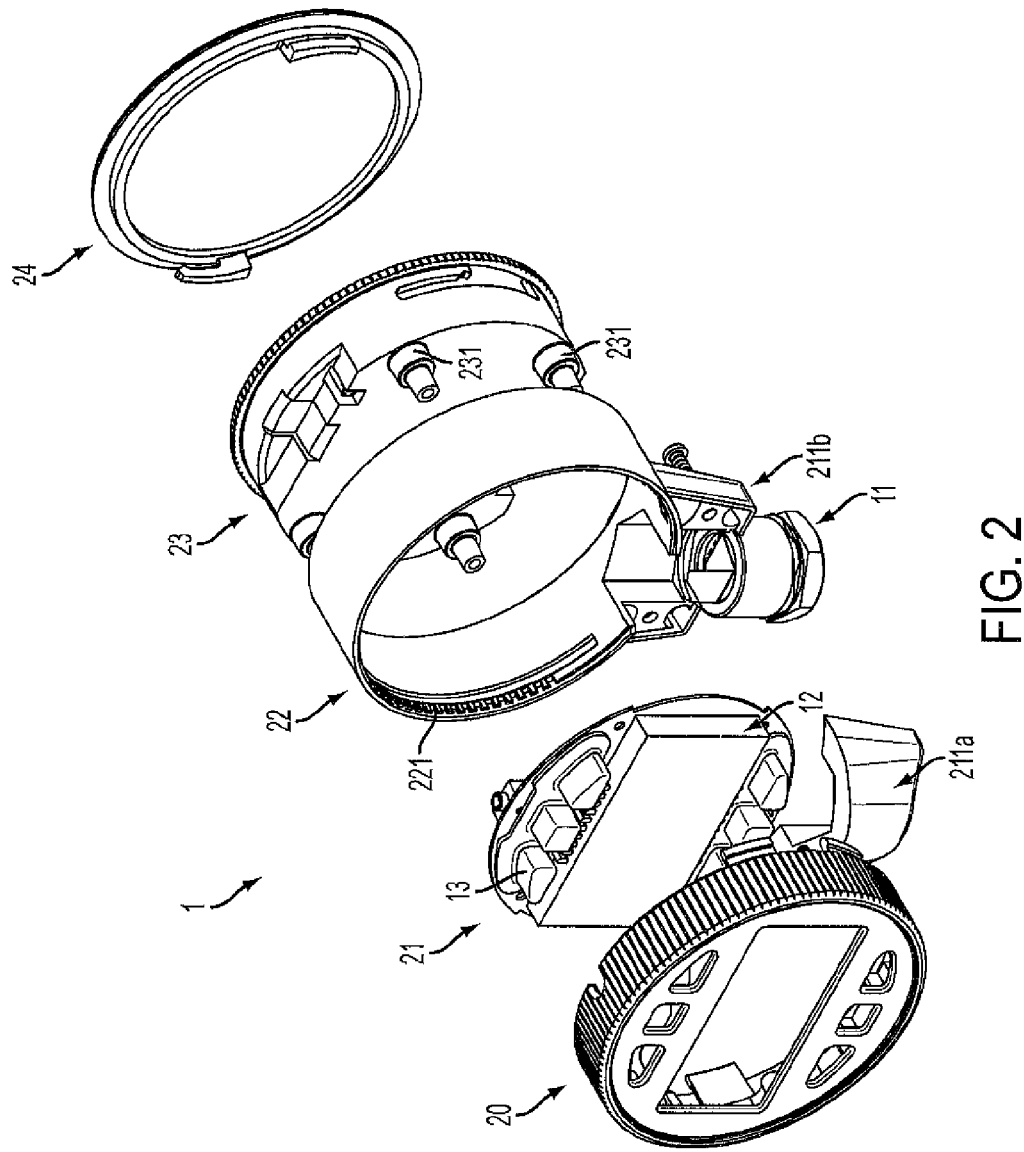
FIG. 2 is a breakaway perspective view of one embodiment of the digital manifold gauge of the present invention.

With reference to FIG. 2, shown are the components of gauge 1 in an expanded breakaway view. As shown, the gauge body comprises a plurality of components including a faceplate 20, a circuit board 21, a primary housing 22, a back plate 23 and a finish ring 24. The primary housing 22 is charged with supporting and containing the basic components of the gauge. The circuit board 21 is received within the primary housing 22 and secured therein by faceplate 20 and backplate 23; thus, the circuit board is disposed between the faceplate 20 and the backplate 23. In some embodiments, the faceplate 20 and the backplate 23 are configured to snap into or be secured to each other by one or more screws received in screwholes 231 of backplate 23. The lower portion of the primary housing 22 includes stem back 211b which is configured to mate with stem front 211a to form stem 211. Also attached to the lower portion of the primary housing 22 is the sensor port 11, which is disposed within the stem 211, i.e. between stem front 211a and stem back 211b. The finish ring 24 is received on the back of the primary housing 22 and seals the backplate 23 into the primary housing 22 in order to provide a tight fitment.

In some embodiments, the circuit board 21 retains display 12 and one or more selectors 13. In some embodiments, the circuit board 21 also contains the chipset and electrical connectors necessary for the operational characteristics of the gauge, which components will be discussed in further detail below. Accordingly, in some embodiments, the bottom of the circuit board 21 contains one or more electrical contacts which are in communication with one or more electrical contacts present on the sensor port 11, such that the circuit board 21 can receive signals from one or more sensors connected to the sensor port 11.

Figure 3A:
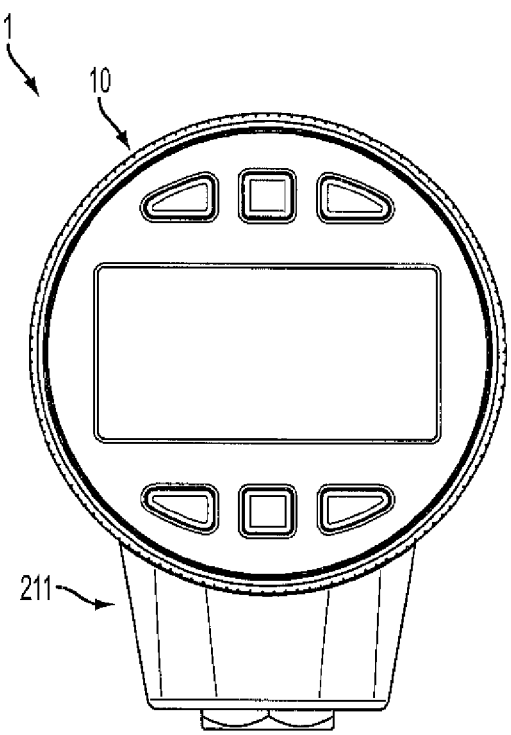
FIGS. 3A-3F are various perspective views of one embodiment of the present invention.
Figure 3B:
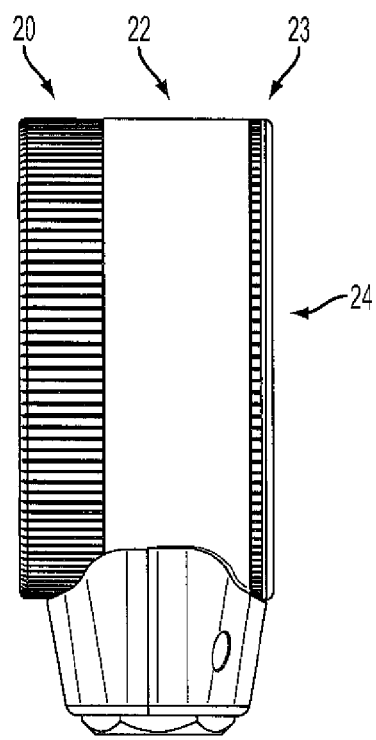
Figure 3C:
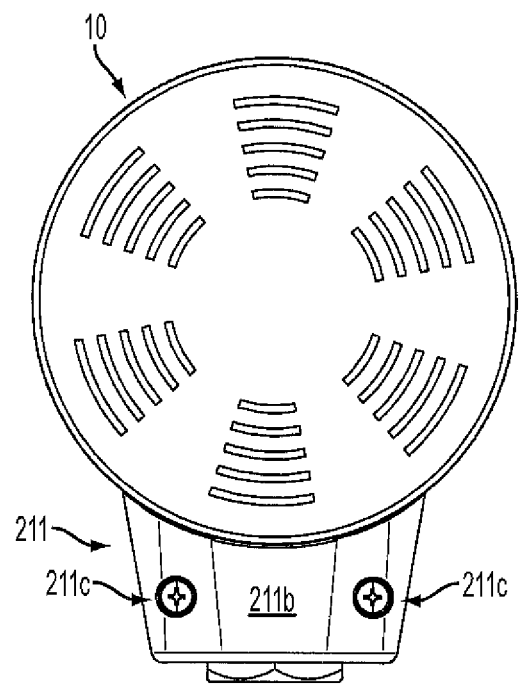
Figure 3D:
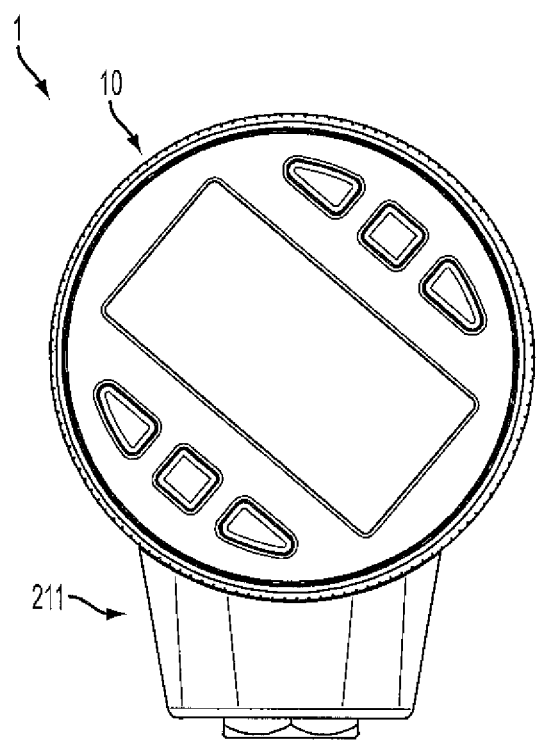
Figure 3E:
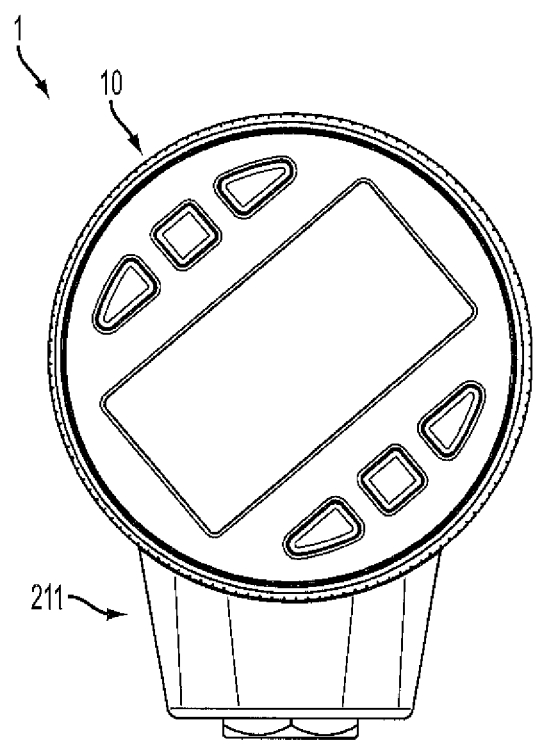
Figure 3F:
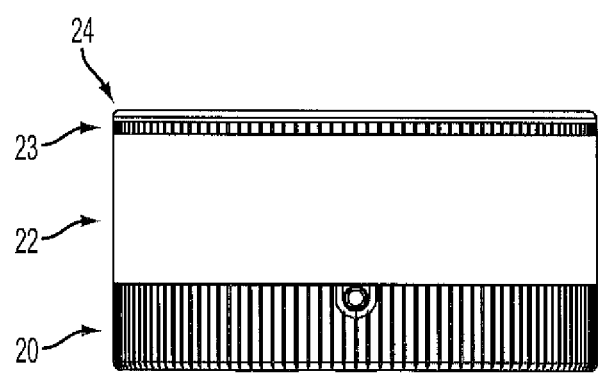

With reference to FIGS. 3A-3F, shown are various views of one embodiment of the assembled gauge 1, including front, side, rear, and top. FIGS. 3B and 3F show the configuration of the gauge body 10 comprising face plate 20, primary housing 22, backplate 23, and finish ring 24, assembled in that order. Stem 211 extends below the primary housing 22 and in some embodiments one or more screws 211c pass through the stem back 211b in order to secure the sensor port 11 between the stem back 211b and the stem front 211a.

With reference to FIGS. 3D and 3E, it is appreciated that the gauge 1 is configured to rotate within primary housing 22. Accordingly, as mentioned previously, the face plate 20 is secured to the backplate 23 with the circuit board 21 disposed there between and the finish ring attached to the outside of the backplate 23. In some embodiments, as mentioned, fasteners are received through screwholes 231 which secure the assembly inside the primary housing 22. This assembly (20-21-23-24) is configured to rotate within the primary housing 22 in order to provide a plurality of viewing positions for the user. This is particularly useful when utilizing the present invention in confined spaces where face on viewing is otherwise not available. In some embodiments, the assembly rotates inside primary housing 22 by X° in either direction. In some embodiments the assembly can rotate a full 360°. In other embodiments, the assembly can rotate in either direction less than a full 360°. The range of rotation can be limited by the use of protrusions or notches inside the primary housing or on the backplate 23 or front plate 20; see for example notches 222 on primary housing 22 shown in FIG. 2. Such notches can also be used to provide selective to step-wise rotation, each notch allowing an additional degree or increment of degrees of rotation. The rotational ability of the gauge provides a significant advantage over the gauges known in the prior art.

Figure 4A:
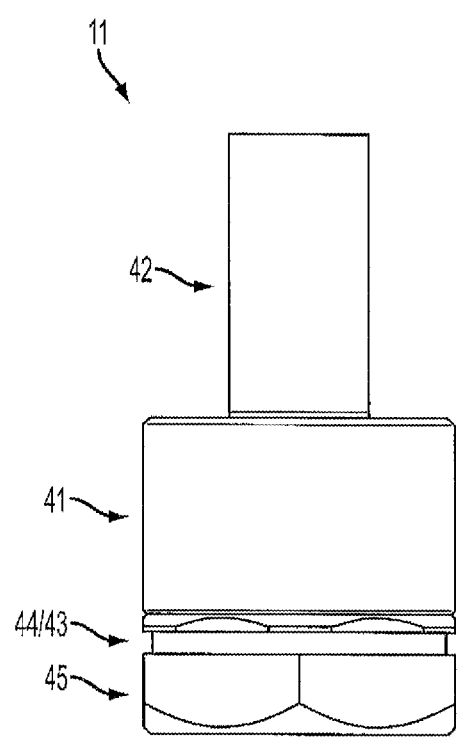
FIGS. 4A and 4B are various perspective views one embodiment of the sensor connector of the present invention.
Figure 4B:
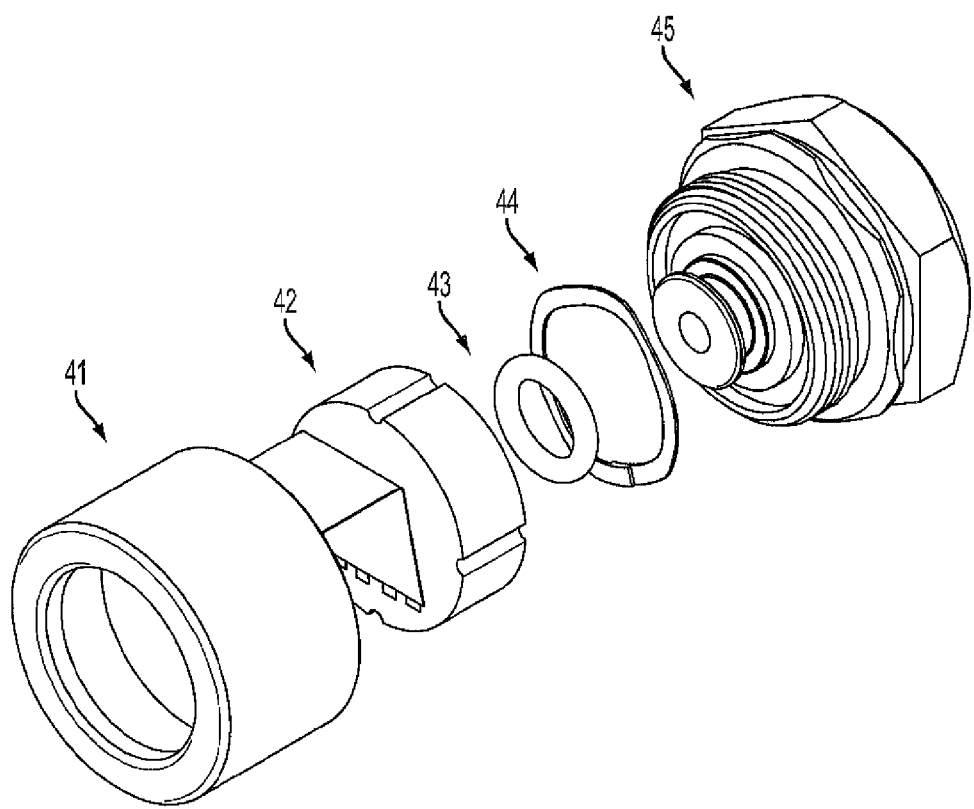

With reference to FIGS. 4A and 4B shown is one embodiment of the sensor port 11 of the present invention. The sensor port 11 is adapted to receive the signal cable from an outboard sensor probe, such as a temperature sensor or pressure sensor. The sensor port 11 is deposed at the bottom of the gauge 1 and is secured between the stem front 211a and the stem back 211b. The sensor port 11 therefore comprises a receiving nut 45, a grommet 44, a washer 43, a sensor circuit element 42 and an outer sleeve 41. As shown in FIG. 4A, the sleeve is disposed around the other components, securing the receiving nut 45 to the circuit element 42 with the washer 43 and grommet 44 disposed therebetween. The receiving nut provides a point of insertion for the sensor probe whereby electrical communication is established between the sensor probe and the circuit element 42, which circuit element 42 further establishing electrical communication with the circuit board 21 of the gauge.

Figure 5:
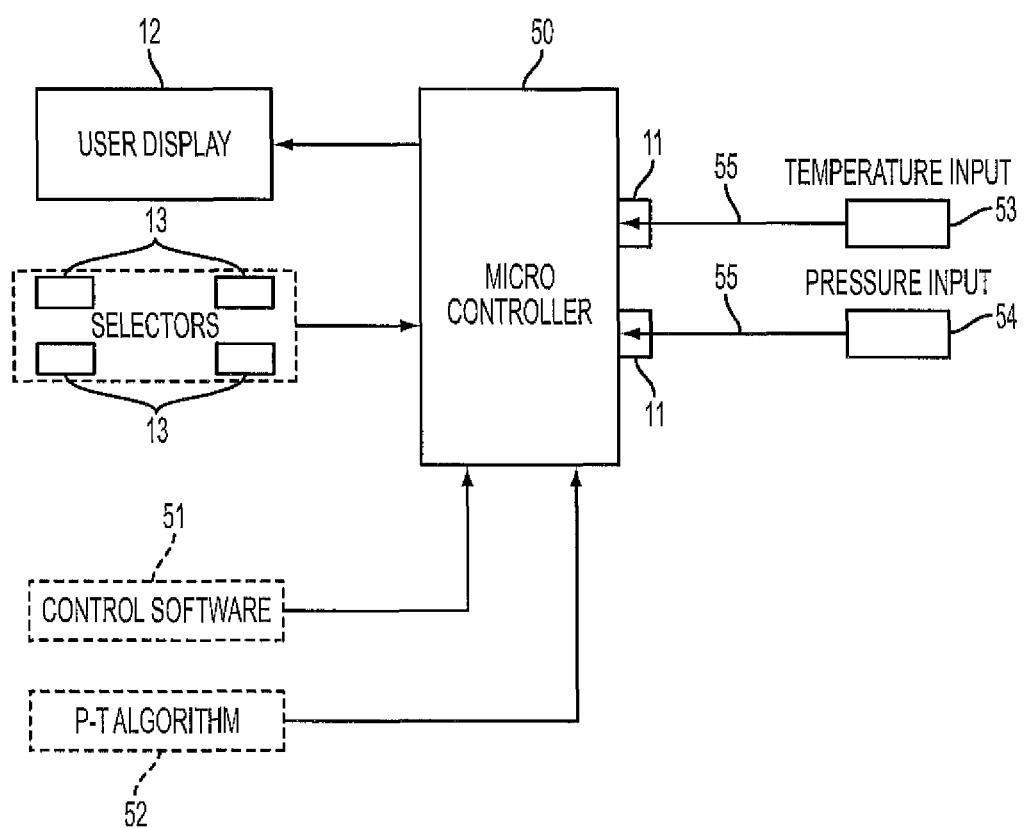
FIG. 5 is a schematic representation of the working components of one embodiment of the present invention.

With reference to FIG. 5, shown is a schematic of the operational components of the gauge of the present invention. The circuit board 21 of the gauge is outfitted with a microcontroller 50 which in some embodiments comprises a chipset containing at least a microprocessor, on-board random access and storage memory, logic and software for data processing, conversion and analysis, and a power supply. The microcontroller 50 is charged with handling receiving, analyzing, and outputting information received from the one or more sensors or inputs 53 and 54 which may be connected to the gauge by way of sensor port 11 describe above. The microcontroller 50 is therefore in electrical communication with the sensor port 11, which sensor port 11 is in electrical communication with one or more sensors or inputs 53 and 54. In some embodiments, the input may comprise a pressure transducer or sensor. In some embodiments, a ceramic pressure sensor is provided as input 54 although other types of sensors/inputs are contemplated. In other embodiments, the input may comprise a temperature transducer or sensor. Other inputs in the form of various sensor probes or transducers that are adapted to measure various characteristics of refrigerants and other HVAC components are envisioned, however. The microcontroller may be powered by a power supply, such as a battery built into the circuit board 21 or the backplate 23 or alternatively the gauge may be powered by an external power supply such as an external battery pack or AC adapter.

The sensors/inputs 53 and/or 54 are placed in flow communication with refrigerant or another gas or liquid flowing through an HVAC system. Typically this is accomplished by inserting the sensor into a manifold or other junction within the subject HVAC system. The sensors are configured to generate an electronic signal, in some cases an analog signal, in response to a detected temperature or pressure. As a result, the microcontroller 50 receives sensor data 55 from the one or more inputs 53/54 and utilizes its internal control software 51 to analyze and convert the sensor data 55 into computer readable digital data. This computer-readable digital data is then processed by the microcontroller and the microcontroller can generate a visual representation of such data on the display 12. In some embodiments, the microcontroller's software 51 and/or internal logic is configured to provide menus, settings, and other information readable on the display 12 which can be manipulated by the user by way of selectors 13. For example, the user may utilize selectors 13 to select or identify the type of refrigerant in the HVAC system, such that the gauge can automatic calibrate itself or call up the particular aspects of its software necessary for processing and analyzing the particular refrigerant.

It is further appreciated that the microcontroller 50 may contain one or more algorithms 52 pertaining to the pressure-saturated vapor temperature relationship of various refrigerants and other substances known in the art. The pressure-temperature relationship is generally a known relationship or set of relationships that can be pre-programmed as an algorithm to allow the digital gauge 1 to calculate temperature based on a pressure reader, and vice-versa. In some embodiments, this enables the gauge 1 to process a pressure reading, i.e. sensor data 55, convert it to computer readable data and then run the computer readable data through the P-T algorithm 52 in order to determine a saturated vapor temperature of a given pressure reading. The gauge 1 can then display the temperature as a function of the pressure directly on the display 12. In some embodiments, the gauge is adapted to receive and process a plurality of instantaneous pressure readings and display both pressure and temperature on the display 12 on demand by using its on-board software and logic. Further, a temperature sensor/input 53 may be employed which may be is used to measure the temperature at specific places or junctions in the HVAC system to provide the user, in conjunction with the built in, digitally produced P-T charts for a multiplicity of refrigerants, with accurate displays of superheat and sub-cooling values for charging and diagnosis of an HVAC system.

Accordingly, the microcontroller 50 of the present invention is configured to generate and analyze data points, such as pressure and temperature, and display such data points in a wide variety of ways directly on the display 12 of the gauge. It is often desirable to employ a relatively high resolution display 12 for its size in order for the data points, graphs, charts, and other information to be easily read and understood by the user. The present invention is not limited to detecting, converting, analyzing, and processing pressure and temperature only; it is envisioned that other characteristics of various HVAC systems can be measured and analysis provided the on board logic and software of the circuit board 21 are configured as such.

It is appreciated and understood that the gauge 1 of the present invention can be comprised of a variety of materials including metals, plastics, composites and the like. Further, the size, shape, and dimensions of the present invention are not limiting provided of course that the gauge is capable of rotating about its primary housing for optimal viewing at all angles in all scenarios. It is further appreciated that the gauge is not limited solely to use in connection with HVAC systems but rather is adapted to accept a wide variety of algorithms and various programming to allow for the detection, conversion, and analysis numerous characteristics of gases and liquids that may be present in various electro-mechanical, hydraulic, and other like systems. It is, however, appreciated that the use of P-T (pressure-temperature) conversion algorithms within the gauge is particularly useful in the HVAC field because it takes the guess work out of converting a detected pressure into a saturated vapor temperature, which temperature reading is often necessary for proper servicing and analysis of a given HVAC system.

The instant invention has been shown and described herein in what is considered to be the most practical and preferred embodiments. It is recognized, however, that departures may be made therefrom within the scope of the invention and that obvious modifications will occur to a person skilled in the art.

What is claimed is:

1. A digital manifold gauge comprising:
 a gauge assembly having a display, one or more selectors, and a circuit board;
 said gauge assembly rotatably disposed within a gauge housing and adapted to rotate to provide a plurality of viewing positions;
 said circuit board in electrical communication with a sensor port; and
 said sensor port adapted to receive a sensor transducer.

2. The digital manifold gauge of claim 1, wherein said sensor transducer comprises a pressure transducer.

3. The digital manifold gauge of claim 2, wherein said circuit board includes a software algorithm adapted to convert pressure data transmitted to said circuit board from said pressure transducer into temperature data.

4. The digital manifold gauge of claim 3, wherein said pressure data and said temperature data can be displayed on said display in real time.

5. The digital manifold gauge of claim 1, wherein said gauge assembly comprises a face plate, said circuit board, a back plate, and a finish ring.

6. The digital manifold gauge of claim 1, wherein said sensor port is disposed below said gauge assembly.

7. The digital manifold gauge of claim 1, wherein said display comprises a liquid crystal display.

8. The digital manifold gauge of claim 1, wherein said display comprises a light-emitting diode display.

9. A method of determining a temperature of a given refrigerant, comprising:
 providing a digital manifold gauge comprising a gauge assembly having a display, one or more selectors, and a circuit board, said gauge assembly rotatably disposed within a gauge housing and adapted to rotate to provide a plurality of viewing positions;

receiving on said circuit board of said digital manifold gauge, from a pressure transducer, sensor data relating to the pressure of said given refrigerant;

converting, by way of software on said circuit board of said digital manifold gauge, said sensor data to computer-readable digital pressure data; and processing said digital pressure data through an algorithm in said software on said circuit board of said digital manifold gauge to generate digital temperature data corresponding to said temperature of a given refrigerant.

10. The method of claim 9, further comprising the step of displaying on said digital manifold gauge, said digital pressure data and said digital temperature data in real time.

11. The method of claim 9, wherein said algorithm includes a pressure-temperature relationship of said given refrigerant.

* * * * *